(12) United States Patent
Abzarian et al.

(10) Patent No.: US 10,345,932 B2
(45) Date of Patent: Jul. 9, 2019

(54) DISAMBIGUATION OF INDIRECT INPUT

(71) Applicant: Microsoft Technology Licensing, LLC, Redmond, WA (US)

(72) Inventors: David Abzarian, Kenmore, WA (US); Nidhi Sanghai, Newcastle, WA (US); Eric C. Brown, Seattle, WA (US); Matthew K. Slemon, Bellevue, WA (US); Jennifer A. Teed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 13/918,746

(22) Filed: Jun. 14, 2013

(65) Prior Publication Data
US 2014/0368444 A1    Dec. 18, 2014

(51) Int. Cl.
*G06F 3/041* (2006.01)
*G06F 3/0488* (2013.01)

(52) U.S. Cl.
CPC .......... *G06F 3/041* (2013.01); *G06F 3/04883* (2013.01); *G06F 2203/04808* (2013.01)

(58) Field of Classification Search
CPC ................. G06F 3/041; G06F 3/04883; G06F 2203/04104; G06F 2203/04808
USPC ......................................................... 345/173
See application file for complete search history.

(56) References Cited

U.S. PATENT DOCUMENTS

| 5,543,591 | A |  | 8/1996 | Gillespie et al. |
| 5,995,084 | A |  | 11/1999 | Chan et al. |
| 6,801,191 | B2 |  | 10/2004 | Mukai et al. |
| 7,054,965 | B2 | * | 5/2006 | Bell ............... G06F 1/1626 345/1.1 |

(Continued)

FOREIGN PATENT DOCUMENTS

| CN | 102023740 A | 4/2011 |
| CN | 102541319 A | 7/2012 |

(Continued)

OTHER PUBLICATIONS

"Gestures, Manipulations, and Interactions (Windows Store Apps)", Published on: Sep. 10, 2012, Available at: http://msdn.microsoft.com/en-us/library/windows/apps/hh761498.aspx, 5 pages.

(Continued)

*Primary Examiner* — Alexander Eisen
*Assistant Examiner* — Mansour Said
(74) *Attorney, Agent, or Firm* — Arent Fox LLP

(57) ABSTRACT

The techniques described herein are directed to a computing device that receives data from an indirect input device. The data received may indicate or signal that one or more objects are on or within a detection area of the indirect input device. For example, the data may indicate that one or more objects are in contact with a surface of an indirect touch device. The techniques include determining parameters for the one or more objects and analyzing the parameters to determine whether the data is directed to a touch operation or to a mouse operation. To perform the touch operation or the mouse operation, the techniques further describe converting the data received from a first coordinate space of the indirect input device to a second coordinate space of a display screen.

20 Claims, 14 Drawing Sheets

(56) References Cited

U.S. PATENT DOCUMENTS

| | | | |
|---|---|---|---|
| 8,355,007 B2 | 1/2013 | Kukulski | |
| 8,370,772 B2* | 2/2013 | Chien et al. | 345/173 |
| 9,003,334 B2* | 4/2015 | Kukulski | G06F 3/04845 345/157 |
| 2002/0158851 A1 | 10/2002 | Mukai et al. | |
| 2006/0227116 A1* | 10/2006 | Zotov et al. | 345/173 |
| 2009/0109183 A1* | 4/2009 | Carvajal | G06F 3/0416 345/173 |
| 2009/0256817 A1 | 10/2009 | Perlin et al. | |
| 2010/0245260 A1* | 9/2010 | Louch | G06F 3/038 345/173 |
| 2010/0283747 A1* | 11/2010 | Kukulski | G06F 3/0488 345/173 |
| 2011/0265021 A1* | 10/2011 | Chien | G06F 3/04883 715/769 |
| 2013/0106754 A1* | 5/2013 | Kukulski | 345/173 |
| 2013/0113716 A1 | 5/2013 | Williams et al. | |
| 2013/0162519 A1* | 6/2013 | Ameling et al. | 345/156 |
| 2014/0028554 A1* | 1/2014 | De Los Reyes et al. | 345/173 |
| 2015/0253891 A1* | 9/2015 | Westerman | G06F 3/03547 345/173 |

FOREIGN PATENT DOCUMENTS

| | | |
|---|---|---|
| CN | 102830858 A | 12/2012 |
| EP | 2485139 | 8/2012 |

OTHER PUBLICATIONS

"Let your figers do the clicking, scrolling and swiping." Magic Trackpad, Published on: Aug. 31, 2010, 3 pages.

"Press Release", Elecom Press Release, Published on: Nov. 13, 2012, 5 pages.

"Responding to Mouse Interactions (Windows Store apps)", Published on: Aug. 18, 2012, Available at:http://msdn.microsoft.com/en-us/library/windows/apps/hh700408.aspx, 6 pages.

"Synaptics TouchPad Interfacing Guide", Synaptics Inc., Published on: Jan. 22, 2001, Available at:http://ccdw.org/~cjj/l/docs/ACF126.pdf, 91 pages.

Osterlund, Peter, "Synaptics(5)—Linux Man Page", Published on: Aug. 9, 2007, Available at:http://linux.die.net/man/5/synaptics, 5 pages.

PCT search report and written opinion dated Feb. 24, 2014 for PCT Application No. PCT/US2013/061077, 8 pages.

"First Office Action and Search Report Issued in Chinese Patent Application No. 201380077437.9", dated Feb. 5, 2018, 37 Pages.

"Office Action Issued in European Patent Application No. 13773505.6", dated Feb. 26, 2018, 8 Pages.

"Office Action Issued in European Patent Application No. 13773505.6", dated Nov. 19, 2018, 11 Pages.

"Second Office Action and Search Report Issued in Chinese Patent Application No. 201380077437.9", dated Sep. 30, 2018, 9 Pages.

* cited by examiner

DISAMBIGUATION OF INDIRECT INPUT

BACKGROUND

Previously, indirect touch devices (e.g., touchpads) were configured to receive input from a single object (e.g., a finger or a pen/stylus) in contact with a surface, and provide, to an operating system, signals indicating movement of the single object to implement a mouse operation (e.g., manipulating a cursor on a display screen). Recently though, indirect touch devices have evolved and are now configured to receive input from multiple objects simultaneously in contact with the surface, and provide, to the operating system, signals indicating movement of the multiple objects to implement a touch operation (e.g., a zoom gesture or a pan gesture based on at least two object contacts). However, there may be scenarios when a user interacting with the indirect touch device may want the operating system to perform a mouse operation instead of a touch operation even though multiple objects are in contact with the surface. Conventional indirect touch devices and/or computing systems are unable to disambiguate between multi-contact input that is directed to a mouse operation and multi-contact input that is directed to a touch operation.

SUMMARY

The techniques described herein are directed to a computing device that receives data from an indirect input device. The data received may indicate or signal that multiple objects are providing input to an indirect input device on or within a detection area of the indirect input device. The techniques then determine parameters for one or more of the multiple objects and analyze the parameters to determine whether the data is directed to a touch operation or to a mouse operation. Example parameters may include, but are not limited to, an inter-arrival input time of two or more objects, an inter-arrival input distance of two or more objects, a movement distance of object input on or within a detection area, an input duration of an object, a region where detection of object input is initiated on or within a detection area, a positive button state of an indirect touch device or other input device, and/or whether an indirect touch device is associated with a state of inertia.

To perform the touch operation or the mouse operation, the techniques further describe converting the data received from a first coordinate space of the indirect input device to a second coordinate space of a display screen. For instance, the techniques may determine an absolute distance (e.g., in himetrics) that an object providing input to an indirect input device moves based on absolute positions of the input on or within a detection area (e.g., x-y coordinates in the first coordinate space) and a size of the detection area of the indirect input device. Then, the absolute distance that an object moves may be mapped to a corresponding pixel distance of movement on a display screen, the pixel distance being calculated based on one or more of a size of the display screen or a resolution of the display screen. Accordingly, a computing device can execute applications or other functionality designed and built to receive direct touch input based on the input received via the indirect input device. At least some reasons this may be advantageous is that indirect input devices are more precise than direct touch devices such as a touch screen and indirect input devices are typically less expensive to produce than direct touch devices.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
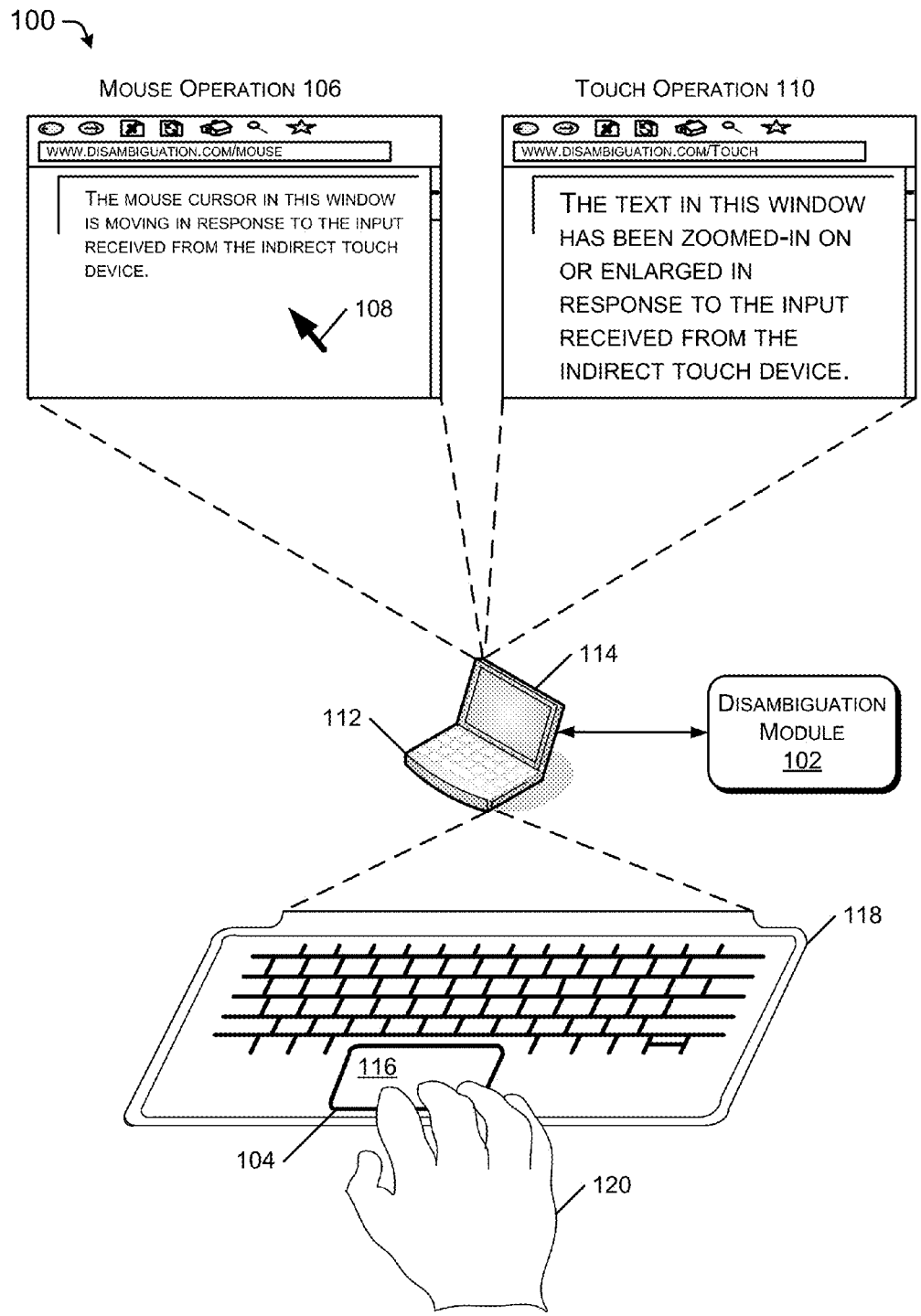
FIG. 1 illustrates an example implementation of a disambiguation module configured to determine whether input provided to an indirect touch device is directed to a mouse operation or to a touch operation, in accordance with various embodiments.

The techniques described herein receive data representing input provided to an indirect input device from a user, and determine and/or analyze one or more of a variety of parameters to determine whether the input is intended to be mouse input directed to a mouse operation or intended to be touch input directed to a touch operation. That is, the techniques are able to intelligently interpret the input provided to the indirect input device to improve the user interaction experience with the indirect input device. After determining whether the input is directed to the mouse operation or to the touch operation, the techniques may convert the received data so that the detected movement of objects is accurately and precisely reflected on a display screen. For instance, the techniques may move a cursor (e.g., a mouse operation) a distance on the display screen that accurately reflects an amount of object movement on a detection area of an indirect input device. Or, the techniques may implement different levels and/or precision of panning, zooming, or other touch operations on the display screen that accurately reflect an amount of object movement relative to the indirect input device, e.g., on or within a detection area of an indirect input device.

Conventional indirect touch devices and/or computing systems are unable to determine whether multiple simultaneous objects in contact with a surface of the indirect touch device are directed to a mouse operation or to a touch operation. Rather, conventional indirect touch devices and/or computing systems currently determine whether the input is directed to a mouse operation or to a touch operation based solely on a number of objects simultaneously in contact with a surface of the indirect touch device. That is, if one object is in contact with the surface of the indirect touch device, then conventionally the input is determined to be directed to a mouse operation. If more than one object is in contact with the surface of the indirect touch device, then conventionally the input is determined to be directed to a touch operation.

However, the manner in which the conventional indirect touch devices and/or computing systems currently determine whether the input is directed to a mouse operation or to a touch operation may frustrate the user interaction experience. For instance, a user may intend to manipulate the cursor on a display screen (e.g., a mouse operation) with a pointer finger but may also be inadvertently resting a thumb on the surface of an indirect touch device (e.g., resulting in multiple objects simultaneously in contact with the surface). Conventional indirect touch devices and/or computing systems may incorrectly interpret the input as being directed to a touch operation (e.g., a pan operation, a zoom operation, or another touch operation) based solely on a determination that there is more than one object in contact with the surface, thereby frustrating the user interaction experience with the indirect touch device because the user intent of the input (e.g., mouse input directed to a mouse operation) is not reflected on the display screen.

In another example, the user may intend to perform a touch operation via movement of a single object in contact with the surface (e.g., implement a panning operation while playing a game). Meanwhile, the conventional indirect touch devices and/or computing systems may incorrectly interpret the input as being directed to a mouse operation based on the single object contact.

Thus, the techniques described herein improve the user interaction experience with an indirect input device, e.g., an indirect touch device or any other indirect input device including a non-touch indirect input device by determining and analyzing one or more of a variety of parameters that provide indications that input (e.g., contact from objects on a detection area such as a surface or detection of objects within a detection area) received at the indirect input device is likely directed to a touch operation or to a mouse operation. Moreover, the techniques describe converting the input, whether directed to a mouse operation or to a touch operation, into a coordinate space associated with a display screen.

As further discussed herein, by converting input received at an indirect input device into a coordinate space associated with the display screen, a computing device is able to execute an application that expects to receive direct touch input (e.g., input from a touch screen) based on the input received from the indirect input device. In other words, a computing device that is unable to receive direct touch input (e.g., no operable touch screen) can execute applications or other functionality designed and built to receive direct touch input based on input received via the indirect input device.

FIG. 1 illustrates an example environment 100 including a disambiguation module 102 that implements techniques as described herein. As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface), firmware, and so on.

In the illustrated example 100, the disambiguation module 102 is configured to determine whether input received at an indirect touch device 104 is directed to a mouse operation 106 (e.g., movement of a cursor 108) or a touch operation 110 (e.g., a zoom operation or a pan operation). In various embodiments, the disambiguation module 102 is part of a computing device 112 that includes, or is connectable to, a display screen 114. The computing device 112 may include, but is not limited to, a laptop computer, a desktop computer, a tablet computer, a portable computer, a smart phone, a mobile phone, a personal digital assistant (PDA), an electronic book device, a gaming console, a personal media player device, a server computer or any other electronic device that is configured to receive data from an indirect input device and process the data so that corresponding operations can be executed by the computing device 112 and/or corresponding display information can be reflected on the display screen 114 (e.g., accurate movement of a cursor, an appropriate or precise amount of zoom or pan, etc.).

As discussed herein, the indirect touch device 104 may be one of a variety of touchpads or other digitizer devices that are capable of sensing contact between an object and a detection area 116 (e.g., surface) of the indirect touch device 104. The indirect touch device 104 may then generate and/or send data signals to the computing device 112 based on the sensed contact. In various embodiments, the indirect touch device 104 may be part of a keyboard 118 or other data input mechanism that is part of, or connectable to, the computing device 112. In some implementations, the indirect touch device 104 may be a separate data input mechanism that is individually part of, or connectable to, the computing device 112. Unlike direct touch devices (e.g., a touch screen) where a display location is directly associated with input based on where a user touches the screen, input from an indirect touch device 104 has to be mapped or converted to a corresponding location on a display screen.

As discussed herein, an "object" is a physical tool or part that can be detected by an indirect input device. For example, an object may be used to apply contact to the detection area 116 of the indirect touch device 104. In another example, a non-contact indirect input device may detect a gesture of an object (e.g., a hand, an arm, a body) in a detection area. As illustrated in FIG. 1, the objects that apply contact to the detection area 116 may be the fingers or a thumb of a hand 120 of a user interacting with the indirect touch device 104. The interaction may be associated with functionality executing on the computing device 112 (e.g., web browsing, watching a video, playing a game, reading an electronic book, etc.). In some implementations, the object may be a pen, stylus, or other pointer-based tool or mechanism controlled by a user to contact the detection area 116 and/or apply an activating force to signal input (e.g., a button press).

As discussed herein, a "contact" between an object and the detection area 116 may be associated with physical contact (e.g., a finger physically touches a surface of the indirect touch device 104 at a particular location) or may be associated with a close distance (e.g., a finger is determined to be within a pre-defined vicinity of the surface, but not in actual physical contact with the surface). As discussed herein, an object may remain in contact with the detection area for a period of time and, while remaining in contact with the detection area, may move from one position to another position on the detection area. In various embodiments, the movement of objects in contact with the detection area is performed to implement and/or receive some corresponding response on the display screen 112 (e.g., movement of a cursor as a mouse operation or zooming as a touch operation).

Figure 2:
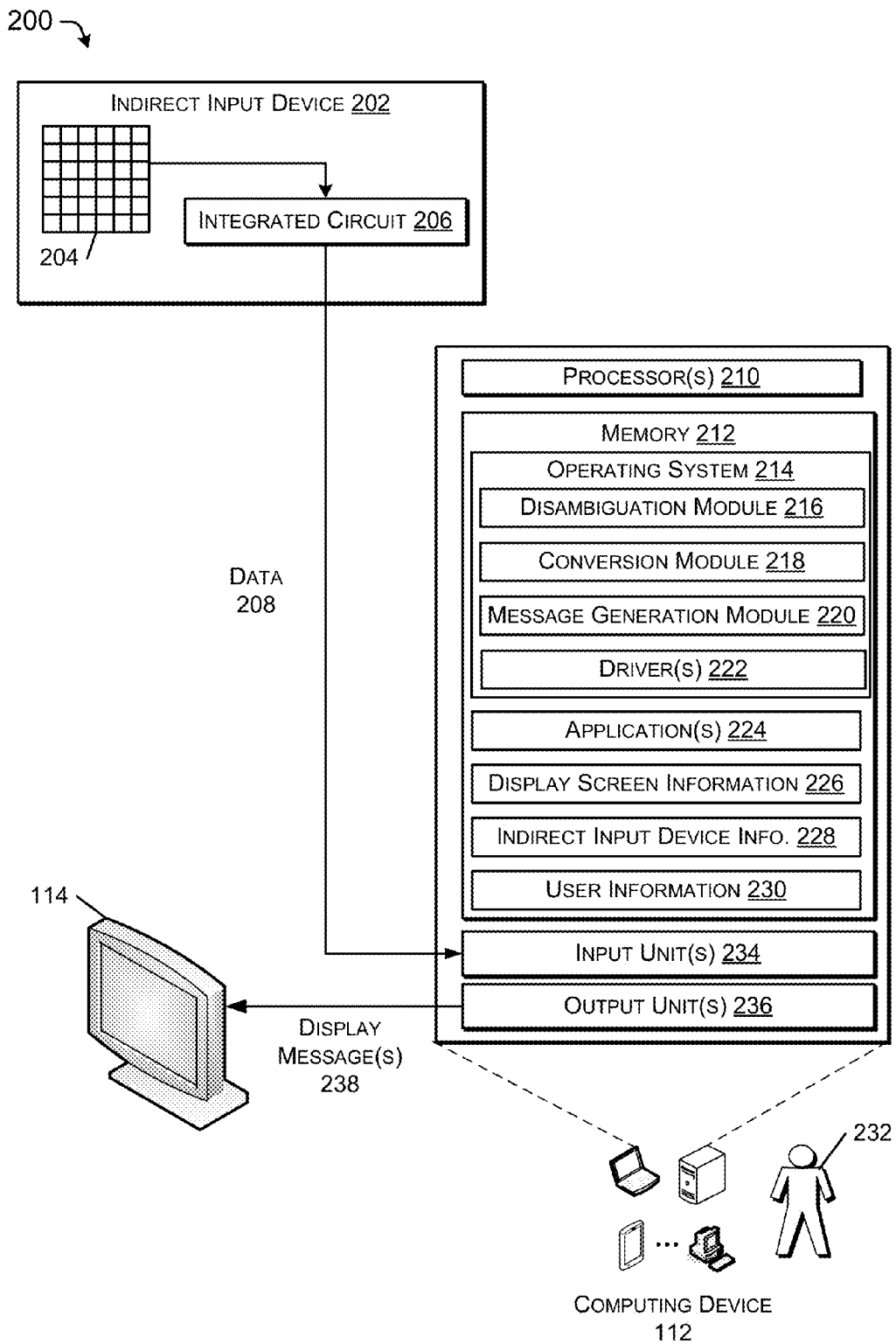
FIG. 2 illustrates an example environment and components for determining whether input provided to an indirect input device is directed to a mouse operation or to a touch operation, in accordance with various embodiments.

FIG. 2 illustrates an environment 200 that further describes components of an indirect input device 202, for example, the indirect touch device 104 in FIG. 1. Other example indirect input devices 202 may include non-touch or non-contact indirect input devices, e.g., devices that include, or are coupled to, one or more cameras capable of detecting one or more positions or outlines of an object within in a detection area (e.g., detecting two-dimensional or three-dimensional air gestures). FIG. 2 also further describes components of the computing device 112.

The indirect input device 202 may include a variety, or an array, of sensors 204 positioned to detect indirect input (e.g., contact on a detection area of an indirect touch device or an air gesture within a detection area of a non-touch indirect input device). In the example of an indirect touch device such as device 104, sensors 204 can be positioned on the side, underneath and/or above a detection area (e.g., capacitive sensors, conductance sensors, optical sensors such as cameras, etc.). In the example of a non-touch indirect input device, the sensors (e.g., cameras) may be located in positions to detect air gestures or other non-touch input (e.g., via capturing of images). The sensors 204 are configured to determine or sense when an object is providing input to a detection area and provide a signal to the integrated circuit 206 (IC) indicating such input. Based on the signals from the sensors 204, the IC 206 is able to relay, generate and/or report data 208 about the input to the computing device 112. For instance, the IC 206 may include logic to determine and define location information and/or timing information for an input (e.g., a position of input on or within the detection area at a point in time). The location information and/or timing information may be associated with an initiation of input for an object, a termination of input for the object and/or object movement that occurs between initiation and termination. In various embodiments, the indirect input device 202 and IC 206 may report the data 208 in real-time. In other embodiments, the indirect input device 202 and IC 206 may report the data 208 in accordance with a periodic reporting schedule (e.g., ten millisecond intervals, twenty millisecond intervals, thirty millisecond intervals and so forth). Accordingly, the data 208 sent from the indirect input device 202 to the computing device 112 may include the location information and/or the timing information for input from multiple objects and the information reported may represent movement of the objects on or within a detection area.

The computing device 112 may include one or more processors 210 and memory 212. The processor(s) 210 may be a single processing unit or a number of units, each of which could include multiple different processing units. The processor(s) 210 may include a microprocessor, a microcomputer, a microcontroller, a digital signal processor, a central processing unit (CPU), a graphics processing unit (GPU), etc. Alternatively, or in addition, the techniques described herein can be performed, at least in part, by one or more hardware logic components. For example, and without limitation, illustrative types of hardware logic components that can be used include a Field-programmable Gate Array (FPGA), a Program-specific Integrated Circuit (ASIC), a Program-specific Standard Products (ASSP), a state machine, a Complex Programmable Logic Device (CPLD), other logic circuitry, a system on chip (SoC), and/or any other devices that manipulate signals based on operational instructions. Among other capabilities, the processors 210 may be configured to fetch and execute computer-readable instructions stored in the memory 212.

The memory 212 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

The memory 212 includes an operating system 214 that is configured to manage hardware and services within and coupled to the computing device 112 for the benefit of other modules, components and devices. In various embodiments, a disambiguation module 216, such as disambiguation module 102, is part of the operating system 214. However, in some embodiments, the disambiguation module 216 can be separate from the operating system 214. The operating system 214 may include a conversion module 218, a message generation module 220 and/or one or more drivers 222, each of which is further discussed herein.

In some implementations, some or all of the functionality performed by the disambiguation module 216 and/or the conversion module 218 may be performed by a device driver 222 associated with the indirect input device 216. The driver 222 may communicate with the indirect input device 202 through a bus or other communications subsystem that connects hardware to the computing device 112.

The memory 212 may also store, or otherwise have access to (e.g., network or other communications connections), one or more applications 224 (also known as apps), display screen information 226, indirect input device information 228 and/or user information 230 associated with a user 232. The user 232 may be interacting with the indirect input device 202 and/or viewing the display screen 114 in association with execution of one of the applications 224 or other computer device 112 functionality.

Example applications 224 may include a browsing application, a gaming application, a media player application, an email application, an instant messaging application, a data processing application, a social networking application and so forth. The display screen information 226 may include a size of the display screen and a resolution of a display screen, which may be used to convert the input received at the indirect input device 202 to a corresponding operation on the display screen 114 (e.g., cursor movement, a zoom operation and so forth). In various embodiments, the display screen information 226 may be determined from a device driver 222 associated with the display screen 114. The indirect input device information 228 may indicate a type of the indirect input device 202 that is currently providing the data 208 to the computing system 112. The indirect input device information 228 may also include a size of the detection area (e.g., physical dimensions such as width and height) of the indirect input device 202 as well as a coordinate space used to report input and/or movement of one or more objects on or within the detection area.

In various embodiments, the operating system 214 may consider and/or leverage an application or display window context when disambiguating between mouse input and touch input. For example, a particular multi-contact touch gesture may have a specific command or instruction for a gaming application executing on the computing device 112. The operating system 214 may also consider and/or leverage an application or display window context when converting the input received at the indirect input device 202 to mouse operations or touch operations implemented on the display screen 114. For example, the gaming application may indicate, to the operating system 214, that a particular level or degree of panning precision associated with touch input may improve the performance and user experience of playing the game. Therefore, the disambiguation and converting techniques further discussed herein may be performed in light of an application or display window context, thereby improving the user interaction experience. The operating system 214 may make a determination that the user 232 is likely focused on a particular display window or application, opposed to other display windows or applications executing, based on a window being in an active state, a current location of the cursor on the display screen (e.g., hover location), a recently activated window or selected menu item or icon, a "foreground" property of a window determined by an operating system, or other criteria. Moreover, the operating system 214 may also make a determination that the user 232 is likely focused on a particular display window or application on any one of multiple side-by-side display screens or monitors based on a window being in an active state, the location of the cursor, or other criteria.

In various embodiments, the operating system 214 may consider and/or leverage the user information 230 associated with the user 232 when disambiguating between mouse input and touch input and/or when converting the input received at the indirect input device 202 to mouse operations or touch operations implemented on the display screen 114. For example, the user information 230 may be compiled and aggregated based on previous user interactions on the indirect input device 202. The operating system 214 knows the user identity based on log-in credentials or other user authentication and recognition techniques. Accordingly, the disambiguation and converting techniques further discussed herein may be performed in light of user habits (e.g., implicit data determined for the user 232 based on a history of interactions with indirect input device 202) and/or user preferences (e.g., explicit input settings defined by the user 232 for interactions with indirect input device 202) maintained in the user information 230, thereby improving the user interaction experience. In some instances, the disambiguation techniques further discussed herein may be performed based on querying an executing application for nearby user interface elements (e.g., in a display window) that can be manipulated via touch input. For example, if a mouse cursor is near an element that can be touched then input can be interpreted as touch input on the indirect input device and directed to the nearby element.

In various embodiments, the computing device 112 may also include input unit(s) 234 to receive input from the user (e.g., an indirect input device 202, a keyboard 118, mouse, microphones, other sensors, cameras, etc.) and output unit(s) 236 to convey and/or visually present information to the user (e.g., display screen 114, speakers, printer, etc.).

Figure 3:
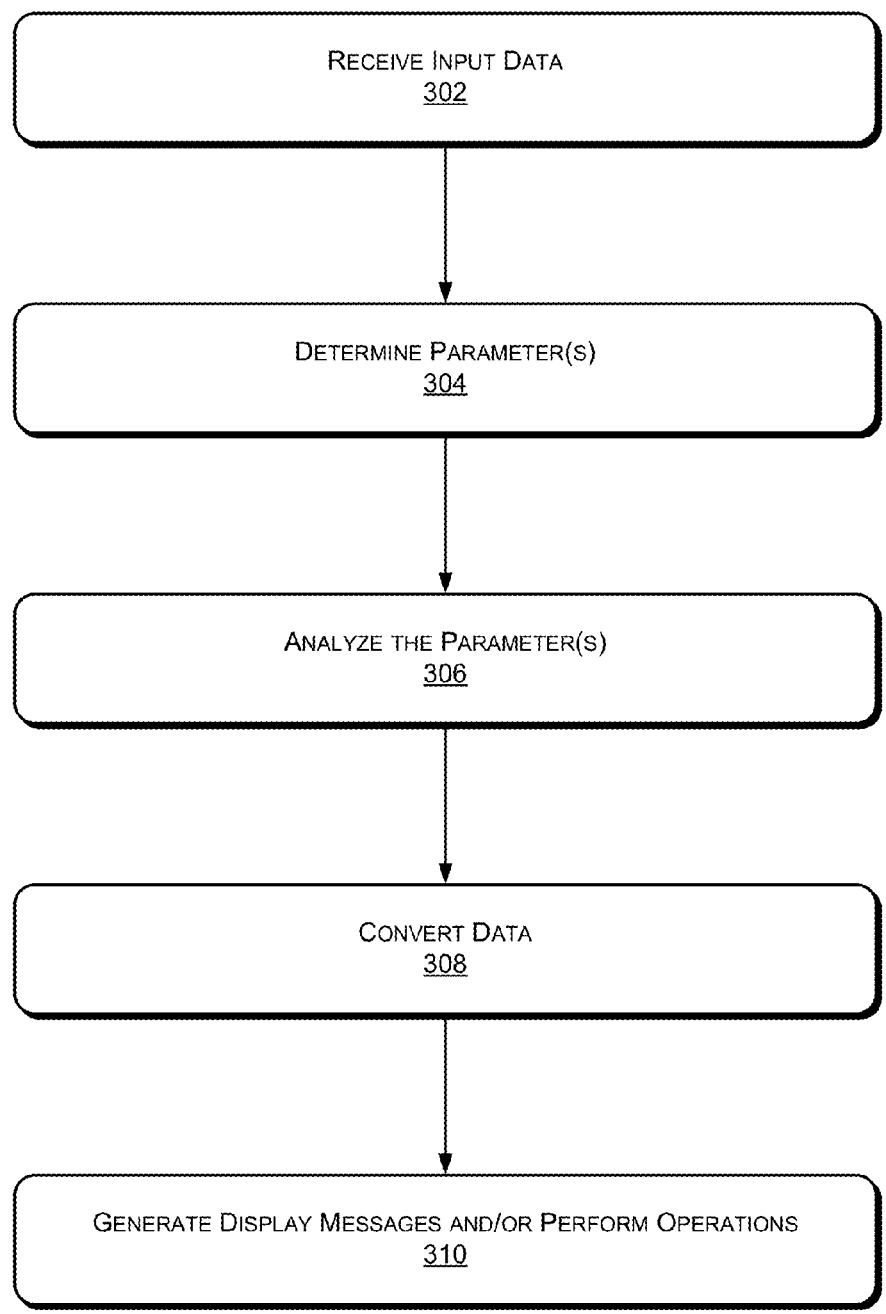
FIG. 3 illustrates an example process for disambiguating data received from an indirect input device and converting the data so that a corresponding operation can be executed and/or corresponding display information can be displayed on a display screen, in accordance with various embodiments.

FIG. 3 illustrates an example process 300 that includes operations directed to disambiguating and converting input received from an indirect input device 202, such as an indirect touch device 104. The processes described in this document are illustrated as logical flow graphs, which represent a sequence of operations that can be implemented in hardware, software, firmware, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. In some embodiments, any or all of the operations may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface), firmware, and so on. The order in which the operations are described is not intended to be construed as a limitation, and any number of the described operations can be combined in any order and/or in parallel to implement the processes. The example operations in FIG. 3 may be described with reference to the modules, components and/or elements illustrated in FIGS. 1 and 2.

At operation 302, the operating system 214 of the computing device 112 receives input data. For example, the operating system 214 of the computing device 112 can receive data 208 indicating that inputs from one or more objects have been detected by sensors 204 (e.g., an object is in contact with a detection area of an indirect touch device or an air gesture has been detected in a detection area of a non-touch indirect input device). As discussed, the data 208 may include location information and timing information associated with the inputs of the one or more objects (e.g., a position of an object or portion of an object on or within a detection area at a point in time).

At operation 304, a disambiguation module, such as 102 or 216 determines parameters based on the location information and/or the timing information. The disambiguation module 102 or 216 may also determine parameters based on other inputs and/or current execution states of the computing device 112 associated with the indirect input device 202, such as indirect touch device 104. The parameters may include an inter-arrival input time of two objects, an inter-arrival input distance of two objects, a movement distance of object input on or within a detection area, an object input duration, a region where detection of an object input is initiated on or within a detection area, a positive button state of an indirect touch device or other indirect input device, and/or whether an indirect touch device is associated with a state of inertia. The example parameters are further discussed herein with respect to FIGS. 4-11. In some embodiments, the disambiguation module 216 may perform calculations using the data 208 received from the indirect input device 202 to determine a parameter. In other embodiments, the disambiguation module 216 may be able to determine a parameter based on the data 208 without performing calculations (e.g., the IC 206 may directly provide or report the parameters).

At operation 306, a disambiguation module, such as 102 or 216, analyzes one or more of the parameters to determine whether the data 208 is directed to a mouse operation or to a touch operation. In various embodiments, the disambiguation module, such as 102 or 216, analyzes the parameters in light of an application or display window context and/or the user information 230.

At operation 308, the conversion module 218 may convert the input represented by the data 208 to corresponding operations or responses to be implemented on the display screen 114. In various embodiments, the conversion may be based on the determination that the data 208 is directed to the mouse operation or to the touch operation.

At operation 310, the message generation module 220 generates display messages 238 to output to an application 224 and/or the display screen 114 based on the disambiguated input and/or the conversion (e.g., a mouse message or a touch message). The operating system 214 may also perform other device operations (e.g., not related to display) based on the disambiguated input and/or the conversion.

FIGS. 4-11 illustrate various parameters determined and/or analyzed by the disambiguation module, such as 102 or 216, to determine whether input received at an indirect input device is directed to a mouse operation or to a touch operation. While FIGS. 4-11 may be explained herein with respect to contact on a detection area (e.g., surface) of an indirect touch device 104, it is understood in the context of this document that the parameters may be determined for an indirect input device 202 as well, including non-touch indirect input devices.

Figure 4:
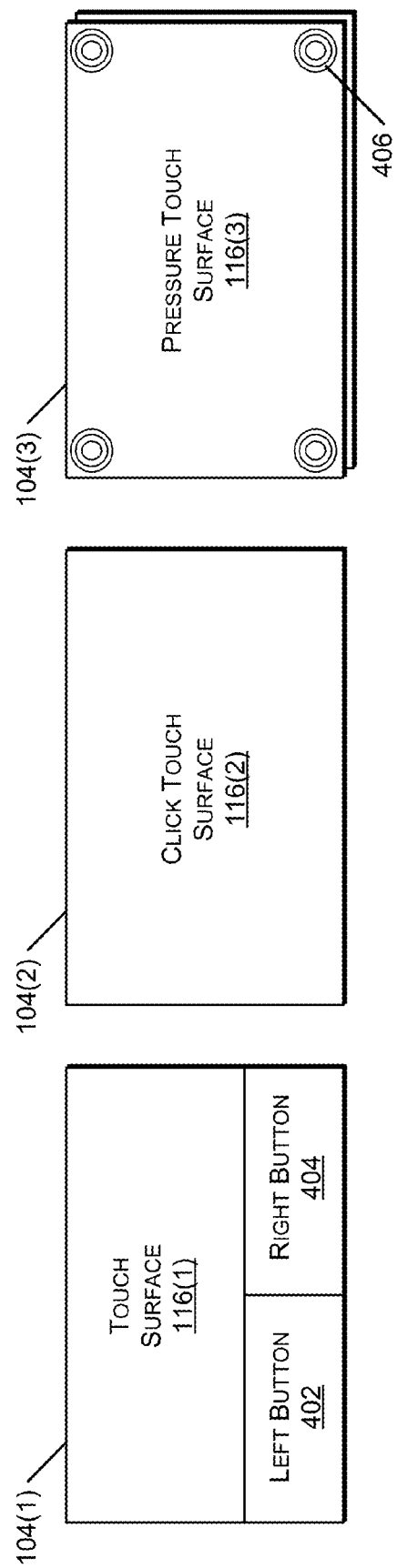
FIG. 4 illustrates example types of indirect touch devices, in accordance with various embodiments.

FIG. 4 illustrates different types of indirect touch devices 104. Each of the different types of indirect touch devices 104 discussed herein may implement button state functionality. In various embodiments, the button state functionality is a parameter considered by the disambiguation module 102 to determine whether input from objects (e.g., multiple simultaneous objects in contact with a detection area) is directed to a mouse operation or to a touch operation. That is, a positive button state (e.g., a button is selected) is typically associated with a mouse operation and not a touch operation. For example, an active left button state may be associated with a selection based on the current location of the cursor (e.g., selection of a menu item, selection of a desktop icon, selection of a hyperlink). An active right button state may be associated with activation of a menu based on the current location of the cursor.

Accordingly, a first type illustrated in FIG. 4 is a "traditional" indirect touch device 104(1) where the touch detection area 116(1) is physically separated from button functionality. The touch detection area 116(1) senses the movement of an object (e.g., a finger) and a left button 402 and/or a right button 404 allow for the user 228 to select display elements and/or activate menus on the display screen. A second type is a "click" indirect touch device 104(2) that includes a click touch detection area 116(2) (e.g., a click-pad). The click touch detection area 116(2) senses movement of an object but also allows the user to implement button functionality by clicking (e.g., tap the click touch detection area 116(2)) anywhere on the click touch detection area 116(2). A third type is a "pressure" indirect touch device 104(3) that includes a pressure touch detection area 116(3) (e.g., a pressure-pad). The pressure indirect touch device 104(3) includes a variety of springs 406 that sense and quantify an amount of force applied when an object is in contact with the pressure touch detection area 116(3). Thus, the pressure touch detection area 116(3) senses movement and/or determines button states based on an amount of force applied by the objects.

In various embodiments, button state functionality may vary based on a region in which a contact is located when the button state is activated or determined to be positive. Moreover, in addition to the button state functionality, the disambiguation module 102 may also consider the type of indirect touch device 104 when disambiguating between mouse input and touch input. For example, it may be easier for a user to perform a click and drag input operation on a traditional indirect touch device 104(1) compared to a pressure indirect touch device 104(3) due to the sensitivity of the springs 406 and an amount of force exerted by the user when contacting the pressure touch detection area 116(3). Accordingly, the disambiguation module 102 may ignore slight variations or changes in pressure when interpreting the input provided to a pressure indirect touch device 104(3).

Figure 5:
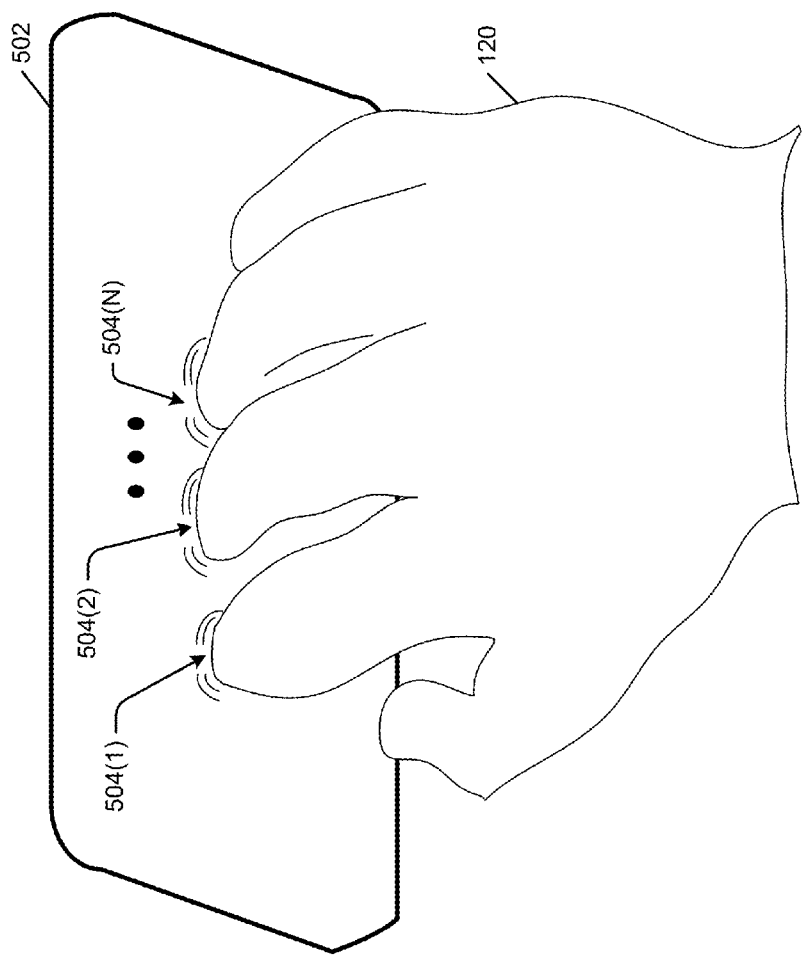
FIG. 5 illustrates an example parameter used to determine whether input provided to an indirect input device is directed to a mouse operation or to a touch operation, in accordance with various embodiments.

FIG. 5 illustrates determining a number of objects that are simultaneously providing input to a detection area (e.g., a surface, a detection field for three-dimensional detection of air gestures using cameras, etc.) as a parameter used to disambiguate between mouse input and touch input. The number of objects that are providing input to a detection area may be determined by the IC 206 of the indirect input device 502 or by the disambiguation module 216. In various embodiments, the indirect input device 502 can represent an indirect touch device 104, an indirect input device 202, or another type of indirect input device. For example, the IC 206 of the indirect touch device 104 and/or the disambiguation module 102 may enumerate the number of inputs between an object and a detection area, as shown by 504(1), 504(2) . . . 504(N). As another example, 504(1), 504(2) . . . 504(N) can illustrate detection points of an object and a plane or detection field that the IC 206 of the indirect input device 202 and/or the disambiguation module 216 may enumerate. For illustration purposes, a contact or detection point as described above is shown by the rippled lines around the pointer finger, the middle finger, and the ring finger. Conversely, the pinky finger of the hand 120 in FIG. 5 is not in contact with the detection area of the indirect input device 502 or within the detection area of another indirect input device.

Figure 6:
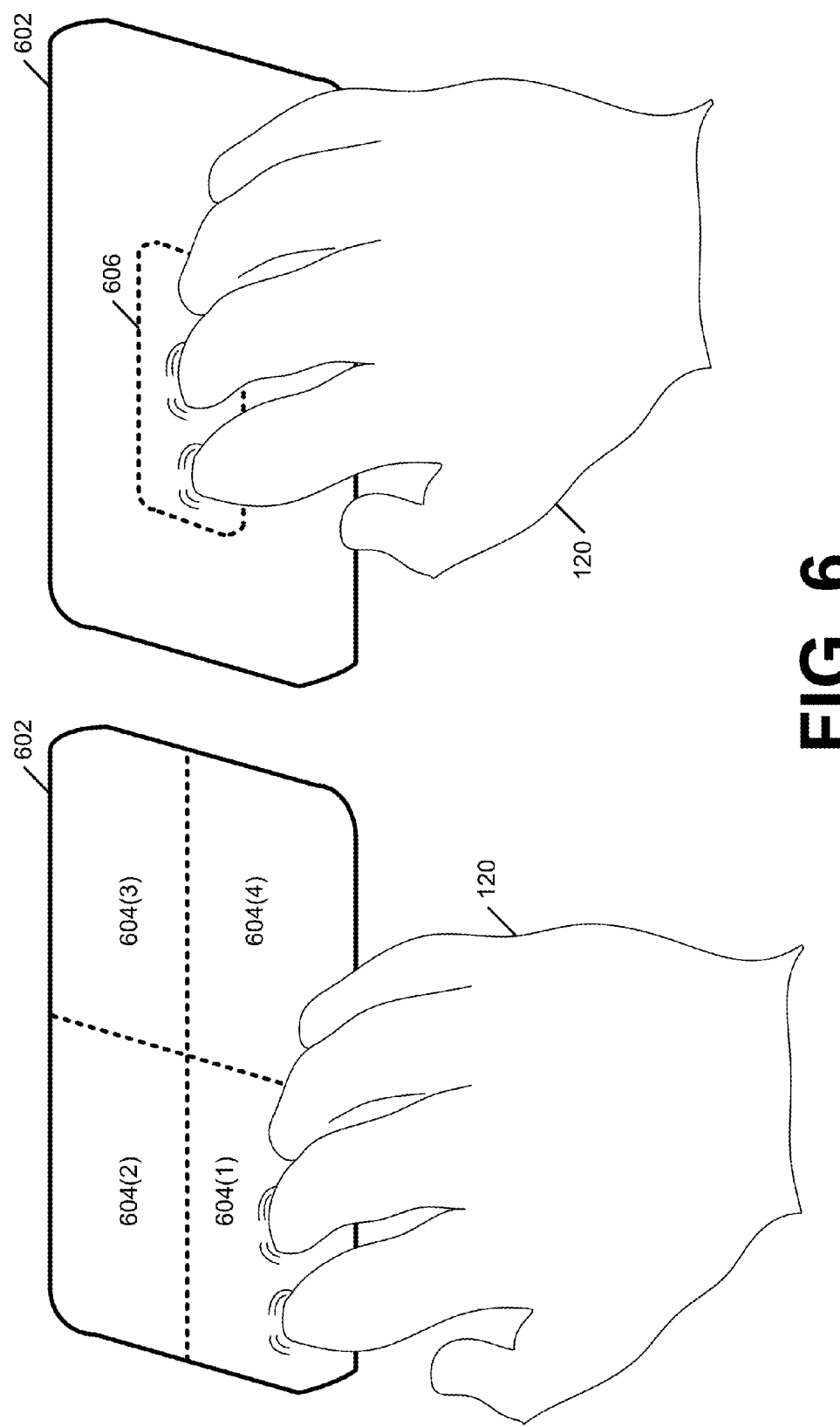
FIG. 6 illustrates an example parameter used to determine whether input provided to an indirect input device is directed to a mouse operation or to a touch operation, in accordance with various embodiments.

FIG. 6 illustrates determining a region of a detection area where an object initiates input with respect to a detection area as a parameter used to disambiguate between mouse input and touch input. For instance, the interaction on the left side of FIG. 6 illustrates that the detection area is divided into four regions, e.g., lower left 604(1), upper left 604(2), upper right 604(3) and lower right 604(4). The disambiguation module, such as 102 or 216, may consider the region of input initiation because particular regions, alone or in combination with various other parameters, may indicate that the input is likely directed to a mouse operation or to a touch operation. For example, an input in region 604(1) may be associated with a left click (e.g., a mouse operation). An input in region 604(4) may be associated with a right click (e.g., also a mouse operation). In contrast, inputs in region 604(2) and/or 604(3) may be associated with a touch operation. As mentioned above, the regions may be defined by, or be associated with, the context of an application or display window. In some instances, the regions may be defined by, or be associated with, the user information 230.

In another example, the interaction on the right side of FIG. 6 illustrates that the detection area may include a centrally-based region 606. Object input initiated in centrally-based region 606 may indicate that the input is more likely directed to a touch operation instead of a mouse operation (e.g., user initiates two contacts in the region 606 and separates the contact to perform a zoom operation).

The layout and configurations of the regions in FIG. 6 are provided as examples. Thus, it is understood in the context of this document that the regions may be defined in accordance with any sort of layout or boundary that may provide an indication that contact is likely directed to a mouse operation or to a touch operation.

Figure 7:
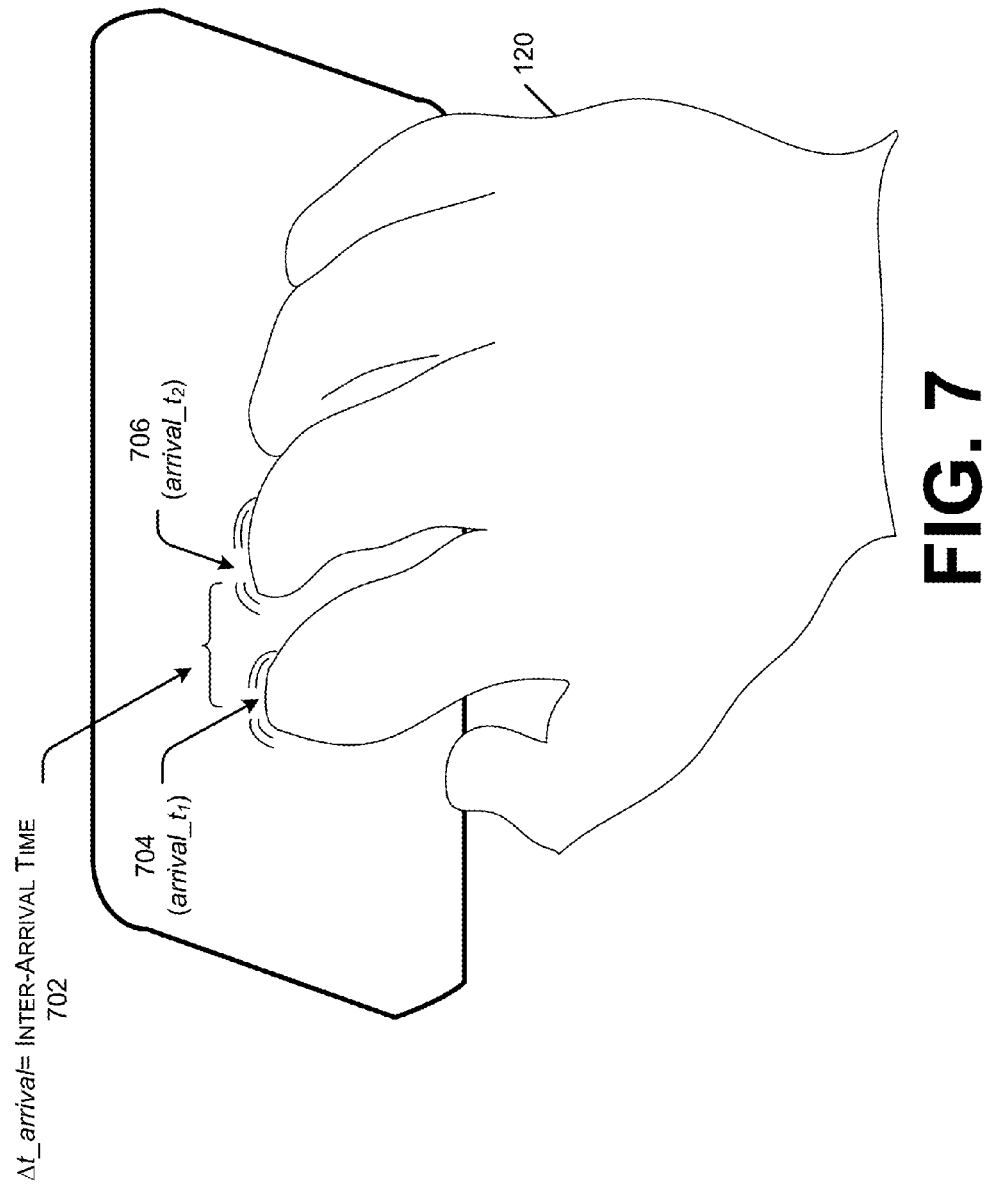
FIG. 7 illustrates an example parameter used to determine whether input provided to an indirect input device is directed to a mouse operation or to a touch operation, in accordance with various embodiments.

FIG. 7 illustrates determining an inter-arrival time 702 of a first input and a second input as a parameter used to disambiguate between mouse input and touch input. The inter-arrival time 702 is the time difference between detection of a first object and detection of a second object. As shown in the example of FIG. 7, the inter-arrival time 702 is the difference ($\Delta t\_arrival$) between a first time ($arrival\_t_1$) when a first object 704 initiates input with a detection area and a second time ($arrival\_t_2$) when a second, different object 706 initiates input with the detection area. The disambiguation module, such as 102 or 216, may determine the inter-arrival time 702 based on the timing information associated with the object inputs included in the data 208.

In some instances, the disambiguation module, such as 102 or 216, may consider the inter-arrival time 702, alone or in combination with various other parameters, because a shorter inter-arrival time 702 may indicate that the inputs are likely directed to a touch operation (e.g., the user puts two fingers down on a surface within a short period of time to perform a zoom operation). In contrast, a longer inter-arrival time 702 may indicate that the inputs are likely directed to a mouse operation (e.g., a primary finger directed to a mouse operation and an inadvertent "resting" thumb typically do not initiate contact within a short period of time).

In various embodiments, the disambiguation module, such as 102 or 216, may use an inter-arrival time threshold (e.g., thirty milliseconds, forty milliseconds, fifty milliseconds and so forth) to determine whether the inter-arrival time 702 indicates that the inputs are directed to a mouse operation (e.g., inter-arrival time is more than the inter-arrival time threshold) or a touch operation (e.g., inter-arrival time is less than or equal to the inter-arrival time threshold). In various embodiments, the inter-arrival time 702 may be determined for each pair of objects detected.

Figure 8:
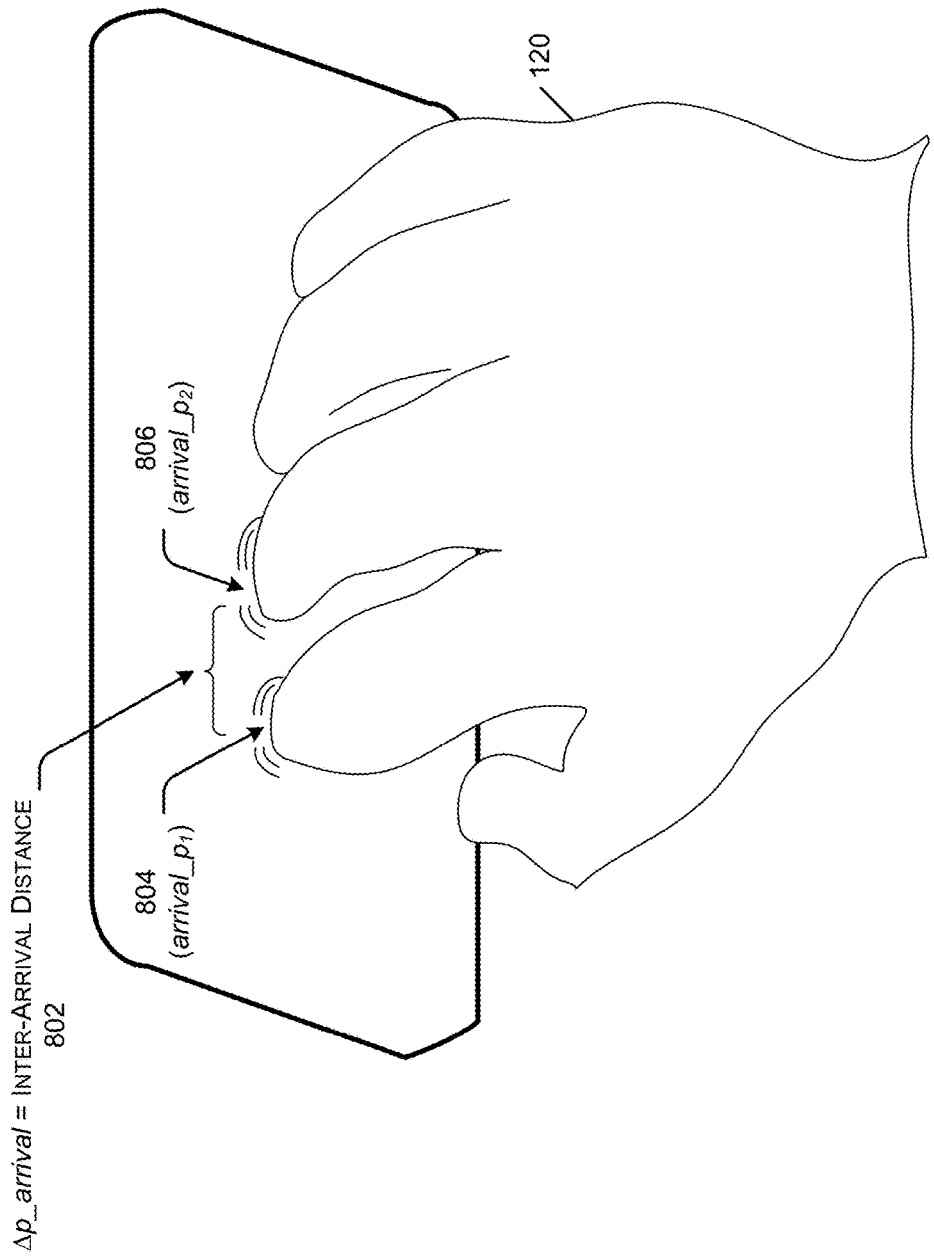
FIG. 8 illustrates an example parameter used to determine whether input provided to an indirect input device is directed to a mouse operation or to a touch operation, in accordance with various embodiments.

FIG. 8 illustrates determining an inter-arrival distance 802 of a first input and a second input as a parameter used to disambiguate between mouse input and touch input. The inter-arrival distance 802 is the positional difference between an input location of a first object and an input location of a second object. As shown in the example of FIG. 8, the inter-arrival distance 802 is the difference ($\Delta p\_arrival$) between a first position ($arrival\_p_1$) where a first object 804 initiates input with a detection area and a second position ($arrival\_p_2$) where a second object 806 initiates input with the detection area. In some instances, the inter-arrival distance 802 may be represented by a vector. The disambiguation module, such as 102 or 216, may determine the inter-arrival distance 802 based on the location information of the object inputs included in the data 208. For example, the positions may be absolute positions represented by a coordinate in a coordinate space of the indirect input device 202.

In some instances, the disambiguation module, such as 102 or 216, may consider the inter-arrival distance 802, alone or in combination with various other parameters, because a shorter inter-arrival distance 802 may indicate that the inputs are likely directed to a touch operation (e.g., the user puts two fingers down close to one another when performing a zoom operation). In contrast, a longer inter-arrival distance 802 may indicate that the inputs are likely directed to a mouse operation (e.g., a primary finger and an inadvertent "resting" thumb do not typically contact a detection area close to one another).

In various embodiments, the disambiguation module, such as 102 or 216, may use an inter-arrival distance threshold (e.g., one fourth the width or height of the detection area, three centimeters, five centimeters and so forth) to determine whether the inter-arrival distance 802 indicates that the input is directed to a mouse operation (e.g., inter-arrival distance 802 is more than the inter-arrival distance threshold) or a touch operation (e.g., inter-arrival distance 802 is less than or equal to the inter-arrival distance threshold). In various embodiments, the inter-arrival distance 802 may be determined for each pair of objects detected.

Figure 9:
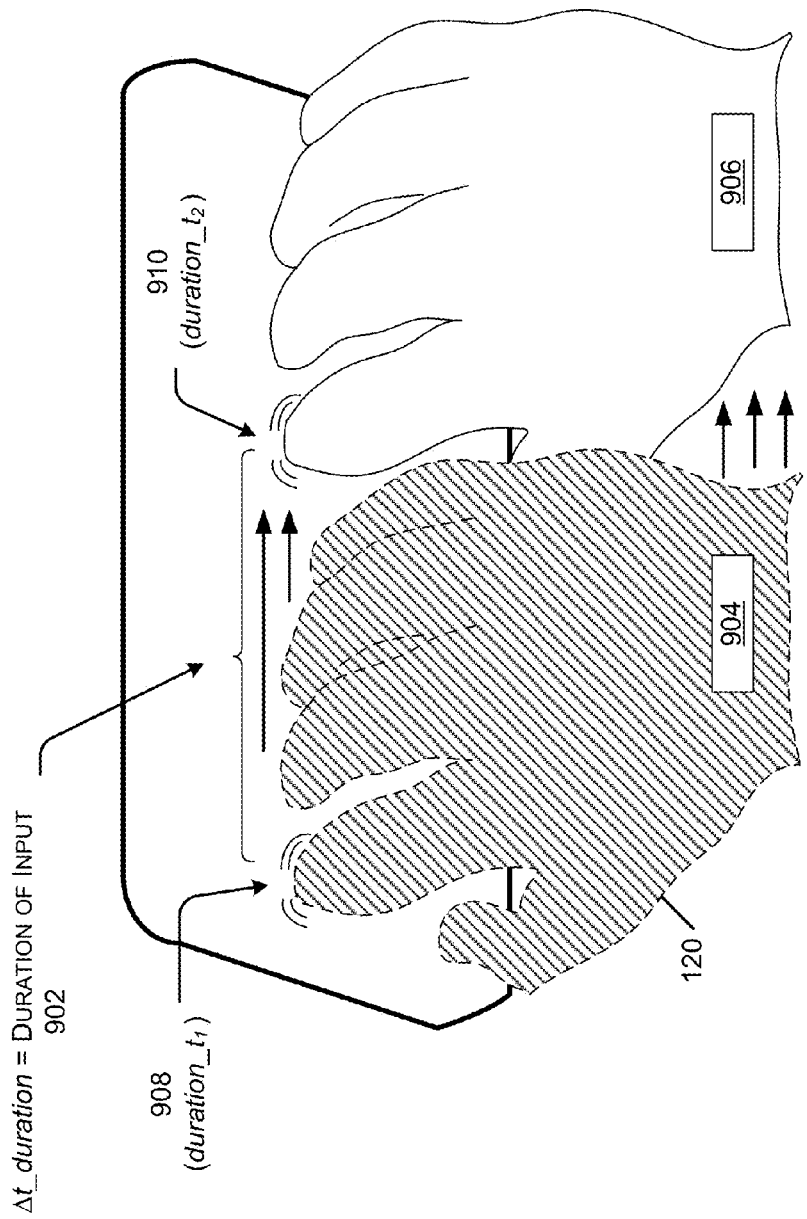
FIG. 9 illustrates an example parameter used to determine whether input provided to an indirect input device is directed to a mouse operation or to a touch operation, in accordance with various embodiments.

FIG. 9 illustrates determining duration of continuous input 902 for a single object as a parameter used to disambiguate between mouse input and touch input. For instance, FIG. 9 shows that the hand 120 of the user moves from location 904 to location 906. In location 904, the finger is providing input to a detection area at a first time 908

(duration_$t_1$). In some embodiments, duration_$t_1$ may correspond to arrival_$t_1$ in FIG. 7. In location 906, the same finger has moved and has provided continuous input to the detection area until a second time 910 (duration_$t_2$), when the user may terminate the input with the detection area (e.g., lift up the finger). The duration of continuous input 902 is the difference (Δt_duration) between the first time 908 and the second time 910. The disambiguation module, such as 102 or 216, may determine the duration of continuous input 902 for each object providing input to the detection area based on the timing information included in the data 208.

In some instances, the disambiguation module 102, such as 102 or 216, may consider the duration of continuous input 902 of an object, alone or in combination with various other parameters, because a longer duration of continuous input 902 may indicate that the input is likely directed to a mouse operation. In contrast, a shorter duration of continuous input 902 may indicate that the input is likely directed to a touch operation.

In various embodiments, the disambiguation module, such as 102 or 216, may use a movement duration threshold (e.g., one hundred milliseconds) to determine whether the duration of continuous input 902 indicates that the input is directed to a mouse operation (e.g., duration of continuous input 902 is more than the movement duration threshold) or a touch operation (e.g., duration of continuous input 902 is less than or equal to the movement duration threshold).

Figure 10:
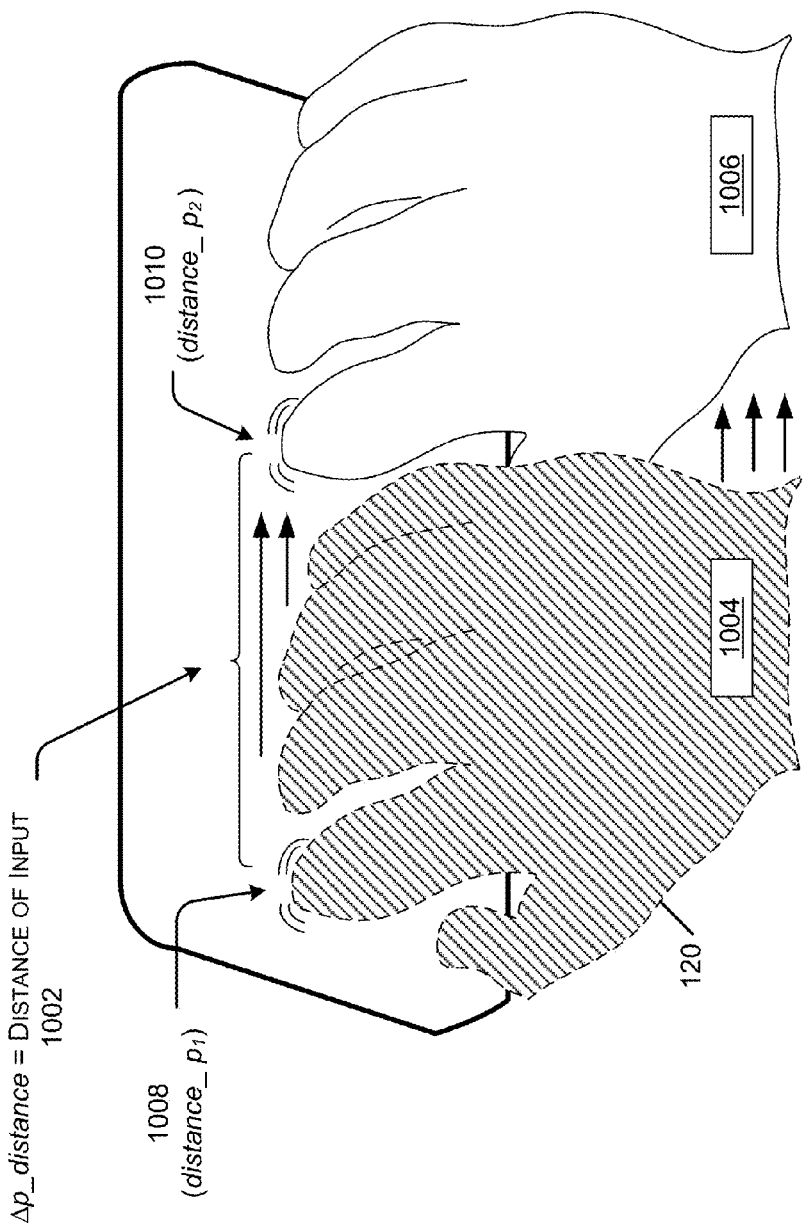
FIG. 10 illustrates an example parameter used to determine whether input provided to an indirect input device is directed to a mouse operation or to a touch operation, in accordance with various embodiments.

FIG. 10 illustrates determining a distance of continuous input 1002 for a single object as a parameter used to disambiguate between mouse input and touch input. For instance, FIG. 10 shows that the hand 120 of the user moves from location 1004 to location 1006. In location 1004, the finger provides input to a detection area at a first position 1008 (distance_$p_1$). In some embodiments, distance_$p_1$ may correspond to arrival_$p_1$ in FIG. 8 and/or duration_$t_1$ in FIG. 9. In location 1006, the same finger has moved and has provided continuous input to the detection area until it reaches a second position 1010 (distance_$p_2$), when the user may stop movement (e.g., terminate contact) or when the indirect input device 202 reports the position as part of a periodic reporting schedule. The distance of continuous input 1002 is the difference (Δp_distance) between the first position 1008 and the second position 1010. In some instances, the distance of continuous input 1002 may be represented by a vector. The disambiguation module, such as 102 or 216, may determine the distance of continuous input 1002 for each object providing continuous input to a detection area.

In some instances, the disambiguation module, such as 102 or 216, may consider the distance of continuous input 1002 of an object, alone or in combination with various other parameters, because a longer distance of continuous input 1002 may indicate that the input is likely directed to a touch operation. In contrast, a shorter distance of continuous input 1002 may indicate that the input is likely directed to a mouse operation.

In various embodiments, the disambiguation module, such as 102 or 216, may use a movement distance threshold (e.g., one fourth the width of a detection area, ten centimeters, etc.) to determine whether the distance of continuous input 1002 indicates that the input is directed to a mouse operation (e.g., distance of continuous input 1002 is less than or equal to the movement distance threshold) or a touch operation (e.g., distance of continuous input 1002 is more than the movement distance threshold).

In various embodiments, the disambiguation module, such as 102 or 216, may determine and analyze the velocity of input movement to determine whether input is directed to a mouse operation or a touch operation. The velocity of input movement may be determined using the (Δp_distance) of FIG. 10 and the (Δt_duration) of FIG. 9. That is, the velocity of input movement is calculated as (Δp_distance/ Δt_duration). In some instances, the velocity of input movement may also be considered when converting the input to display operations. For example, a gaming application may use the velocity of a touch operation to reflect various levels or precision of acceleration while a photograph viewing application may not implement levels or precision based on velocity.

Figure 11:
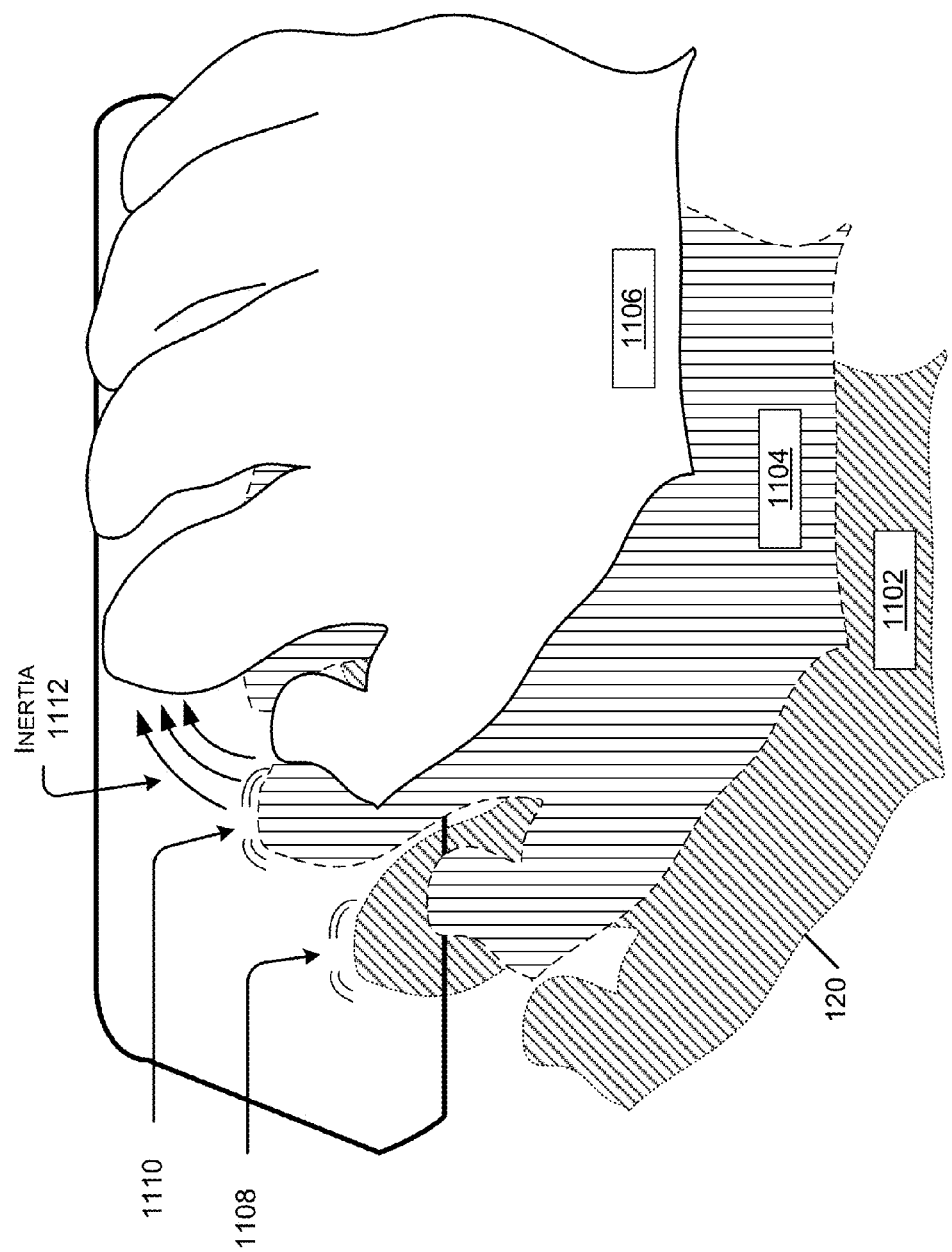
FIG. 11 illustrates an example parameter used to determine whether input provided to an indirect input device is directed to a mouse operation or to a touch operation, in accordance with various embodiments.

FIG. 11 illustrates determining a state of inertia associated with input received at the indirect touch device 104 as a parameter used to disambiguate between mouse input and touch input. Inertia represents a velocity of object movement when the object terminates contact with a detection area (e.g., user lifts up a finger). Thus, FIG. 11 shows the hand 120 of the user moving from a first location 1102, to a second location 1104, and then to a third location 1106. When the hand 120 is at the first location 1102, the pointer finger is in contact 1108 with the detection area. When the hand is at the second location 1104, the pointer finger has moved but is still in contact 1110 with the detection area. When the hand 120 is at the third location 1106, the pointer finger is no longer in contact with the detection area, thereby creating a state of inertia 1112. The velocity of the movement of the pointer finger from contact 1108 to contact 1110 may be calculated as described above (e.g., based on a distance of continuous input and duration of continuous input). The calculated velocity may then be used to continue a mouse operation (e.g., scrolling) or a touch operation (e.g., panning) even though the finger is no longer in contact with the detection area.

In various embodiments, the disambiguation module 102 may use the state of inertia as a parameter to determine how to handle input at the indirect touch device 104. For example, if the computing device 112 is still scrolling or panning through content on the display screen 114, then any new input provided to the detection area of the indirect touch device 104 may be interpreted as an instruction to stop the scrolling or panning due to the state of inertia. In another example, any new input provided to the detection area of the indirect touch device 104 may be interpreted as an instruction to continue or accelerate the scrolling or panning (e.g., add more inertia).

Accordingly, the disambiguation module, such as 102 or 216, may determine (e.g., calculate) and consider one or any combination of the various parameters described above to determine whether input received at an indirect input device 202 is likely to be mouse input directed to a mouse operation or touch input directed to a touch operation. In various embodiments, the parameters considered may depend on an amount of data 208 received (e.g., amount of input movement, amount of input duration, etc.) In various embodiments, the parameters considered may depend on a specific application and/or a type of application executing on the computing device 112 and/or a context of a display window that has the attention and focus of the user (e.g., as determined by the cursor location). In various embodiments, the parameters considered may depend on the user information 230 associated with the user 232 operating the computing device 112. In some instances, the disambiguation module, such as 102 or 216, may prioritize the parameters or weight the parameters.

Moreover, the disambiguation module, such as 102 or 216, may set and/or define the parameter thresholds in accordance with the application, display window and/or user. For instance, for one application the duration of continuous input 902 that is less than the duration of continuous input threshold may indicate the input is likely directed to a mouse operation. However, for another application, the duration of continuous input 902 that is less than the duration of continuous input threshold may indicate the input is likely directed to a touch operation.

Figure 12:
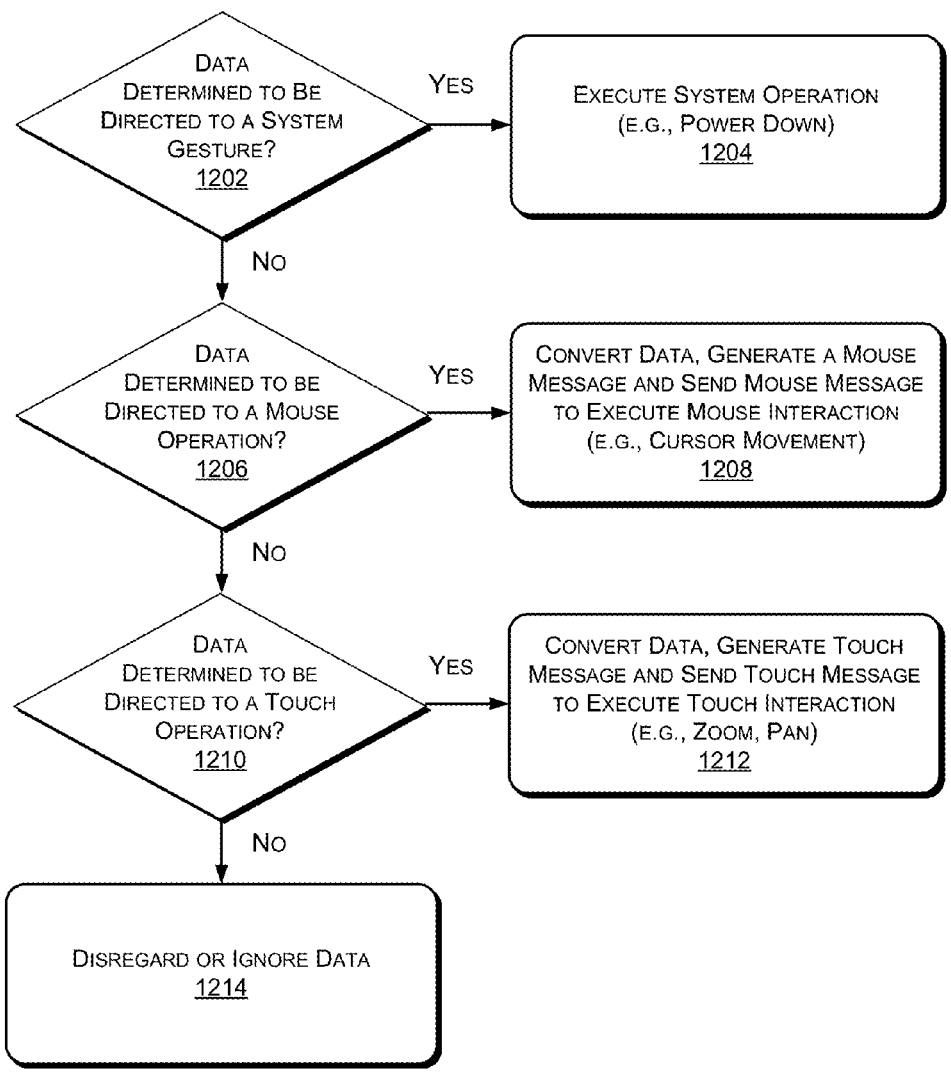
FIG. 12 illustrates an example process that determines whether input provided to an indirect input device is directed to a system gesture, to a mouse operation or to a touch operation.

FIG. 12 illustrates an example process 1200 implemented by the computing device 112. At decision operation 1202, the disambiguation module, such as 102 or 216, determines whether the data 208 received from the indirect touch device 104 or the indirect input device 202 is directed to a system gesture (e.g., power down, return to home screen menu, lock computer, etc.). At times, input received at the indirect touch device 104 or the indirect input device 202 is not directed to an application being executed and/or displayed. Rather, the input may be directed to a system gesture. For instance, the disambiguation module, such as 102 or 216, may determine a system gesture, such as an edge invocation (e.g., displaying a menu of icons and commands invoked by a flick gesture originating from an edge of a detection area), if the input movement and duration satisfy a gesture criterion defined for the system gesture. The criterion may be based on one or more parameters described above. Accordingly, before generating display messages 238 for applications, the operating system 214 determines if the input is directed to a system gesture.

If the answer at decision operation 1202 is "yes", then at operation 1204, the operating system 214 executes the system operation based on the system gesture. If the answer at decision operation 1202 is "no", then the disambiguation module, such as 102 or 216, determines whether the data 208 received from the indirect touch device 104 or the indirect input device 202 is directed to a mouse operation at decision block 1206. The disambiguation module, such as 102 or 216, analyzes one or more of the parameters discussed above to determine if the input is directed to a mouse operation. In some instances, the parameters may be considered based on an application executing or being displayed and/or the user interacting with the indirect touch device 104 or the indirect input device 202.

If the answer at decision operation 1206 is "yes", then at operation 1208, the conversion module 218 coverts the data, the message generation module 220 generates a mouse message that includes instructions based on the converted data, and the message generation module 220 sends the message to an application and/or the display screen 112 so that the mouse operation (e.g., cursor movement) can be executed.

If the answer at decision operation 1206 is "no", then the disambiguation module, such as 102 or 216, determines whether the data 208 received from the indirect touch device 104 or the indirect input device 202 is directed to a touch operation at decision block 1210. Again, the disambiguation module, such as 102 or 216, analyzes one or more of the parameters discussed above to determine if the input is directed to a touch operation. In some instances, the parameters may be considered based on an application executing or being displayed and/or the user interacting with the indirect touch device 104 or the indirect input device 202.

If the answer at decision operation 1210 is "yes", then at operation 1212, the conversion module 218 coverts the data, the message generation module 220 generates a touch message that includes instructions based on the converted data, and the message generation module 220 sends the touch message to an application and/or the display screen 112 so that the touch operation (e.g., a zoom operation) can be executed.

If the answer at decision operation 1210 is "no", then at operation 1214, the disambiguation module, such as 102 or 216, may disregard or ignore the data (e.g., the data may be determined to be inadvertent contact or non-relevant input).

In various embodiments, after the disambiguation module, such as 102 or 216, disambiguates the input, the conversion module 218 may have to perform different conversion processes for input directed to a mouse operation and input directed to a touch operation. One reason for this is that a typical mouse operation (e.g., cursor movement on a display screen) is based on relative distances of input (e.g., finger contact) movement on the detection area of the indirect input device 202, while applications consume a touch operation (e.g., a zoom operation or a pan operation) based on absolute distances between two different inputs on the detection area of the indirect input device 202.

Thus, an operating system 214 disambiguating between mouse input and touch input is presented with a problem because touchpads and other digitizers report absolute positions of input relative to their own coordinate space and physical size (e.g., the width and height of a surface of the detection area), and the coordinate spaces and physical sizes may vary from one touchpad to the next. For example, the absolute distance of a contact that moves from coordinate (0,1) to (0,100) on a first touchpad may be relevantly different than the absolute distance of a contact that moves from the same coordinates (0,1) to (0,100) on a second touchpad (e.g., based on physical dimensions, layout of sensors 204, etc.).

Therefore, the conversion module 218 is configured to determine, based on absolute positions of inputs reported in the data 208, absolute distances of input movement and/or the separation between multiple inputs on or within a detection area of the indirect input device 202 in himetrics (e.g., a himetric is equal to $\frac{1}{1000}$ of a centimeter). The conversion module 218 may then map the absolute distances in himetrics to a corresponding pixel distance on the display screen, as further described with respect to FIGS. 13 and 14.

Figure 13:
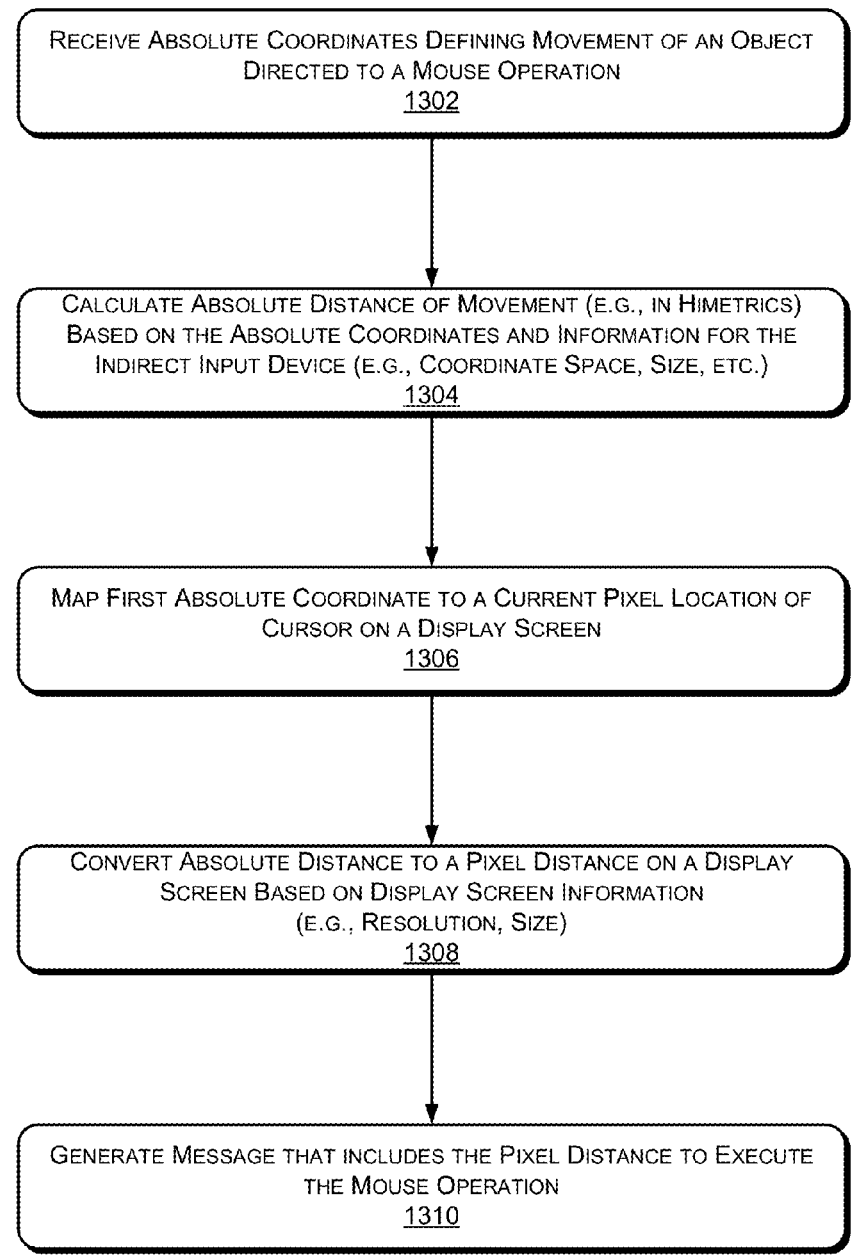
FIG. 13 illustrates an example process that converts mouse input so that a mouse operation can be executed.

FIG. 13 describes an example process 1300 that converts the data 208 so that a mouse operation can be executed.

At operation 1302, the conversion module 218 receives the absolute coordinates (e.g., positions of input) defining movement of an object on or within a detection area of the indirect input device 202. The absolute coordinates may be reported in the data 208, and may indicate that the object is determined to be implementing the mouse operation by moving from a first position (e.g., first absolute coordinate) to a second position (e.g., second absolute coordinate).

At operation 1304, the conversion module 218 calculates an absolute distance of movement of the object based on the absolute coordinates and a size of the detection area defined in the indirect input device information 228. For example, if the absolute coordinates indicate that an object moved from absolute coordinate (0,0) to absolute coordinate (10,0), the whole coordinate space is a 100 by 100 grid, and the dimensions indicate the total width of the detection area is ten centimeters, then the conversion module 218 may determine that the absolute distance of movement for the object is one centimeter (i.e. ten coordinate units in the x-direction corresponds to a tenth of the width, or one centimeter). In some instances, the conversion module 218 calculates the absolute distances in himetrics. The absolute distance may be calculated for x-directional movement and/or a y-directional movement.

At operation 1306, the conversion module 218 maps the first absolute coordinate on the surface to a current pixel location of a cursor on the display screen.

At operation 1308, the conversion module 218 converts the absolute distance calculated at operation 1304 to a pixel distance on the display screen. This conversion may be based on the display screen resolution and/or the physical size of the display screen (e.g., monitor). This information may be stored in the display screen information 226. For example, the pixel distance may be calculated as follows:

$$\text{pixel\_distance} = \frac{\text{absolute distance} \times \text{screen resolution}}{\text{physical dimension of display screen}} \quad (1)$$

As discussed above, the absolute distance in equation (1) may be in himetrics and the pixel distance may be calculated for each of an x-direction and/or a y-direction. In some instances, the absolute distance or the pixel distance may be converted to mickeys (e.g., a mickey is $\frac{1}{200}^{th}$ of an inch). For example, the conversion module 218 may store a fixed himetric to mickey ratio that is used to convert the absolute distance (e.g., in himetrics) to mickeys before calculating the pixel distance. In another example, the pixel distance may be converted to mickeys after the calculation based on a fixed pixel to mickeys ratio.

At operation 1310, the message generation module 220 generates a message that may be provided to the application and/or the display screen, the message including the pixel distance and/or movement instructions based on mickeys. Thus, the mouse input provided to the indirect input device 202 may be reflected on the display screen 112.

Figure 14:
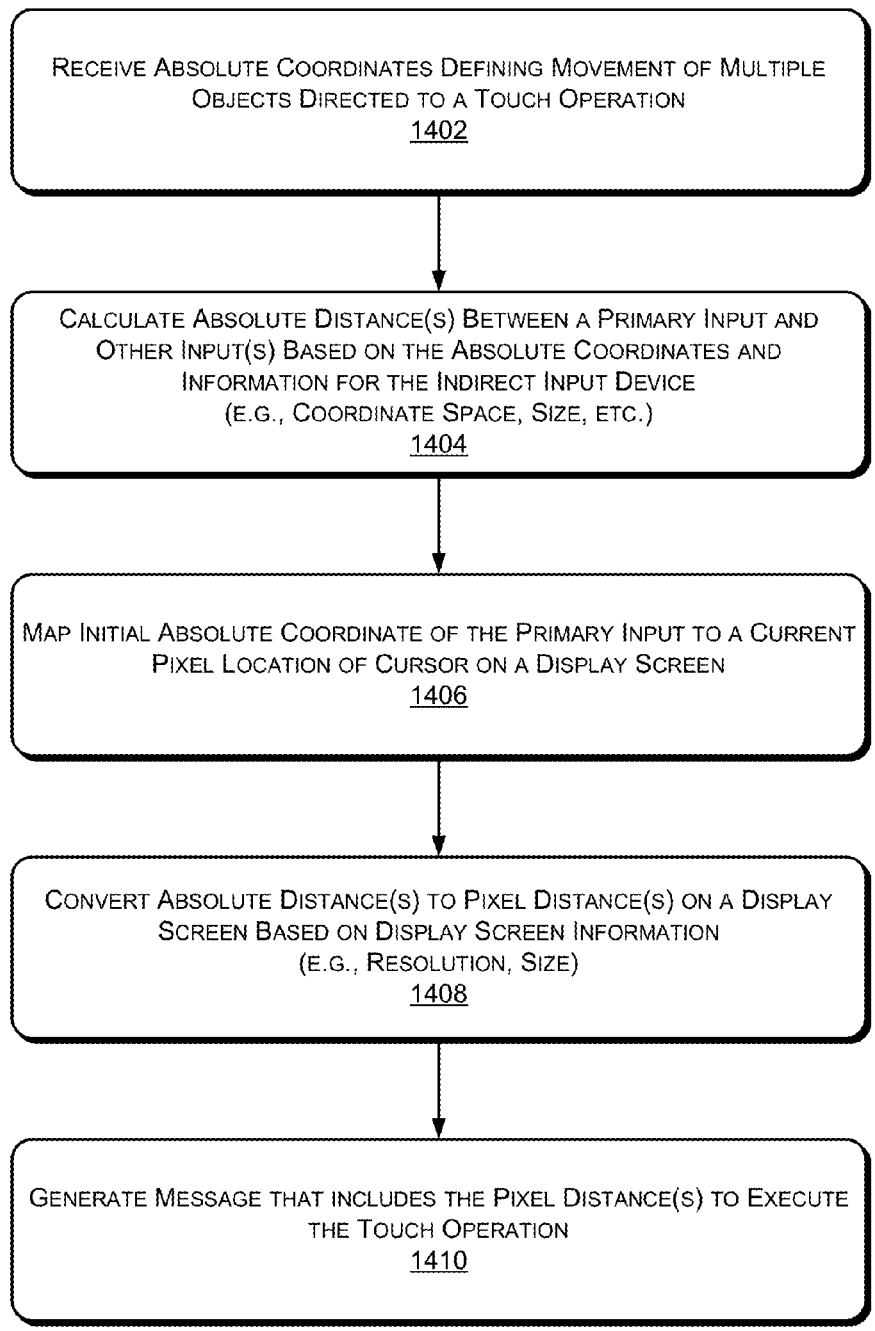
FIG. 14 illustrates an example process that converts touch input so that a touch operation can be executed.

FIG. 14 describes an example process 1400 that converts the data 208 so that a touch operation can be executed. For touch operations, the operating system 214 provides absolute distances (e.g., himetric deltas) between a primary input from a primary object and other inputs from other objects based on the absolute positions reported.

At operation 1402, the conversion module 218 receives the absolute coordinates (e.g., positions of contact) defining movement of multiple objects on or within a detection area of the indirect input device 202. The absolute coordinates may be reported in the data 208, and may indicate that the multiple objects are determined to be implementing the touch operation.

At operation 1404, the conversion module 218 calculates an absolute distance between a primary input and one or more other inputs based on the absolute coordinates and a size of the detection area defined in the indirect input device information 228. In various embodiments, the conversion module 219 calculates the absolute distance in himetrics.

At operation 1406, the conversion module 218 maps the initial absolute coordinate of the primary input to a current pixel location of a cursor on the display screen.

At operation 1408, the conversion module 218 converts the absolute distance(s) calculated at operation 1404 to a pixel distance on the display screen using equation (1) provided above.

At operation 1410, the message generation module 220 generates a message that may be provided to the application and/or the display screen, the message including the pixel distances associated with the separation of inputs. Thus, the touch operation provided to the indirect input device 202 may be reflected on the display screen 112.

In various embodiments, the movement of an input on a detection area of the indirect input device 202 may be non-linearly mapped to corresponding movement on the display screen (e.g., cursor movement, pan movement, zoom movement). For example, the movement may be scaled and/or multiplied based on one or more of the parameters discussed above. For example, an input that moves two centimeters on the detection area at a velocity of ten centimeters per second to implement a pan may see two centimeters of pan on the display screen. However, an input that moves two centimeters on the detection area at a velocity of one hundred centimeters per second to implement a pan may see twenty centimeters of pan on the display screen. In various embodiments, the scaling or multiplication factor may be based on a size (e.g., physical dimensions) of the detection area of the indirect input device 202 and/or a size (e.g., physical dimensions) of the display screen.

CONCLUSION

Although the subject matter has been described in language specific to structural features and/or methodological acts, it is to be understood that the subject matter defined in the claims is not necessarily limited to the specific features or acts described above. Rather, the specific features and acts described above are described as example forms of implementing the claims.

What is claimed is:

1. A method comprising:
receiving, at a computing device from an indirect touch input device and in association with execution of an application configured to receive direct touch input, data indicating detection of a plurality of objects, wherein the data represents at least a movement of an object of the plurality of objects detected by the indirect touch input device;
determining, based on the data, at least one parameter for the object of the plurality of objects;
analyzing, by the computing device, the at least one parameter to disambiguate between a mouse operation associated with a cursor on a display screen, a touch operation associated with a display of content on the display screen, and a system gesture input associated with an operating function of the computing device; and
converting the movement of the object of the plurality of objects for use in the application based at least in part on the analysis indicating the mouse operation, the touch operation, or the system gesture input.

2. The method of claim 1, wherein the at least one parameter comprises an inter-arrival time of at least two objects of the plurality of objects, the method further comprising calculating the inter-arrival time based on timing information in the data that indicates an input detection time of a first object and an input detection time of a second object.

3. The method of claim 2, further comprising:
defining an inter-arrival time threshold; and
comparing the inter-arrival time to the inter-arrival time threshold, wherein the computing device determines that the data is directed to the mouse operation if the inter-arrival time is more than the inter-arrival time threshold and that the data is directed to the touch operation if the inter-arrival time is less than or equal to the inter-arrival time threshold.

4. The method of claim 1, wherein the at least one parameter comprises an inter-arrival distance of at least two objects of the plurality of objects, the method further comprising calculating the inter-arrival distance based on location information in the data that indicates a first position where the indirect touch input device detects input of a first object and a second position where the indirect touch input device detects input of a second object.

5. The method of claim 4, further comprising:
defining an inter-arrival distance threshold; and
comparing the inter-arrival distance to the inter-arrival distance threshold, wherein the computing device determines that the data is directed to the mouse operation if the inter-arrival distance is more than the inter-arrival distance threshold and that the data is directed to the touch operation if the inter-arrival distance is less than or equal to the inter-arrival distance threshold.

6. The method of claim 1, wherein the at least one parameter comprises a region of a detection area of the indirect touch input device where a first object of the plurality of objects initiates input.

7. The method of claim 1, wherein the converting the movement of the object of the plurality of objects further comprises converting the movement to a corresponding representation of movement on the display screen based on at least one of a size of a detection area of the indirect touch input device, a size of the display screen, or a resolution of the display screen.

8. The method of claim 1, further comprising calculating an absolute distance that separates inputs of at least two objects of the plurality of objects relative to the indirect touch input device based at least in part on a size of a detection area of the indirect touch input device and mapping the absolute distance to a corresponding pixel distance on a display screen based on at least one of a size of the display screen or a resolution of the display screen.

9. The method of claim 1, further comprising calculating an absolute distance of movement of input of the object of the plurality of objects relative to the indirect touch input device based at least in part on a size of a detection area of the indirect touch input device and mapping the absolute distance of movement to a corresponding distance of pixel movement on the display screen based on at least one of a size of the display screen or a resolution of the display screen.

10. The method of claim 1, wherein the analyzing the at least one parameter to disambiguate between the mouse operation, the touch operation and the system gesture input comprises determining whether the at least one parameter includes a gesture criterion.

11. One or more computer storage media storing computer executable instructions that, when executed, configure a computer to perform operations comprising:
executing an application configured to receive direct touch input;
receiving data indicating detection of a plurality of objects in a detection area of an indirect touch input device, the data including location information and timing information for at least one object of the plurality of objects;
determining, based on at least one of the location information or the timing information, at least one parameter for the at least one object;
disambiguating between touch input associated with a display of content on a display screen, mouse input associated with a cursor on the display screen, and system gesture input associated with a system operation of the computer based on the at least one parameter; and
converting the data for presentation in association with the application based at least in part on whether the movement is directed to the touch input, the mouse input, or the system gesture input.

12. The one or more computer storage media of claim 11, wherein the at least one parameter comprises a movement distance of at the least one object, and the operations further comprise calculating the movement distance of the at least one object based on the location information in the data that indicates a first position where the indirect touch input device detects the at least one object and a second position where the indirect touch input device detects the at least one object.

13. The one or more computer storage media of claim 12, wherein the operations further comprise:
defining a movement distance threshold based at least in part on an application being executed on the computing device; and
comparing the movement distance to the movement distance threshold to determine whether the data received from the indirect touch input device is directed to the mouse operation, the touch operation, or the system gesture input.

14. The one or more computer storage media of claim 11, wherein the at least one parameter comprises an input duration of the at least one object, and the operations further comprise calculating the input duration of the at least one object based on the timing information in the data that indicates a first detection time associated with initiation of input of the at least one object a second detection time associated with termination of the input of the at least one object.

15. The one or more computer storage media of claim 14, wherein the operations further comprise:
defining an input duration threshold based at least in part on an application being executed on the computing device; and
comparing the input duration to the input duration threshold to determine whether the data received from the indirect touch input device is directed to the mouse operation, the touch operation, or the system gesture input.

16. The one or more computer storage media of claim 11, wherein the at least one parameter is associated with at least one of:
an inter-arrival time of at least two objects;
an inter-arrival distance of the at least two objects;
a region of the detection area of the indirect touch input device where detection of the at least one object is initiated;
an active button state of the indirect touch input device;
an application or a display window that currently has focus; or
whether the indirect touch input device is associated with a state of inertia.

17. The one or more computer storage media of claim 11, wherein the data indicates the mouse input and the location information indicates that at least one object has moved from a first coordinate to a second coordinate, the operations further comprising:
calculating a distance between the first coordinate and the second coordinate based on a size of the detection area of the indirect touch input device;
mapping the distance to a corresponding pixel distance based on at least one of a resolution of a display screen or a size of the display screen; and
generating a message that includes the pixel distance so that a mouse operation can be performed based on the mouse input.

18. The one or more computer storage media of claim 11, wherein the data indicates the touch input and the location information indicates detection coordinates for each of a first object and a second object, the operations further comprising:
calculating a distance of separation between the first object and the second object based on the detection coordinates and a size of the detection area of the indirect touch input device;
mapping the distance to a corresponding pixel distance based on at least one of a resolution of a display screen or a size of the display screen; and
generating a message that includes the pixel distance so that a touch operation can be performed based on the touch input.

19. A system comprising:
one or more processors;
one or more computer memories;
a disambiguation module configured to:
receive data indicating movement of at least one object from a plurality of objects in a detection area of an indirect touch input device; and
determine whether the movement is directed to a mouse operation or to a touch operation, wherein the mouse operation is initiated in a first portion of the detection area and is associated with a cursor on a display screen and the touch operation is initiated in a second portion of the detection area and is associated with a display of content on the display screen; and
a conversion module configured to convert the data indicating the movement from a first coordinate space associated with the indirect touch input device to a second coordinate space associated with an application configured to receive direct touch input that implements the mouse operation or the touch operation, wherein:
the disambiguation module and the conversion module are stored on the one or more memories and operable on the one or more processors, and
the conversion module operable to convert the data based at least in part on whether the movement is directed to the mouse operation or the touch operation.

20. The system of claim 19, wherein the first coordinate space associated with the indirect touch input device corresponds to the detection area of the indirect input device, and wherein the second coordinate space corresponds to a display location associated with the application.

* * * * *